(12) United States Patent
Fiegener

(10) Patent No.: US 11,719,311 B2
(45) Date of Patent: Aug. 8, 2023

(54) WORM DRIVE FIT SYSTEM

(71) Applicant: Tool, Inc., Marblehead, MA (US)

(72) Inventor: John D. Fiegener, Marblehead, MA (US)

(73) Assignee: Tool, Inc., Marblehead, MA (US)

( * ) Notice: Subject to any disclaimer, the term of this patent is extended or adjusted under 35 U.S.C. 154(b) by 263 days.

(21) Appl. No.: 17/358,674

(22) Filed: Jun. 25, 2021

(65) Prior Publication Data

US 2022/0315378 A1   Oct. 6, 2022

Related U.S. Application Data

(60) Provisional application No. 63/170,118, filed on Apr. 2, 2021.

(51) Int. Cl.
| | | |
|---|---|---|
| *F16H 1/22* | (2006.01) | |
| *A41F 1/00* | (2006.01) | |
| *A43C 11/16* | (2006.01) | |
| *A45C 13/10* | (2006.01) | |
| *A43C 1/00* | (2006.01) | |

(52) U.S. Cl.
CPC ............... *F16H 1/222* (2013.01); *A41F 1/00* (2013.01); *A43C 1/00* (2013.01); *A43C 11/165* (2013.01); *A45C 13/1046* (2013.01)

(58) Field of Classification Search
CPC . F16H 1/222; F16H 1/16; F16H 1/203; A41F 1/00; A43C 1/00; A43C 11/165; A45C 13/1046; A42B 3/145
See application file for complete search history.

(56) References Cited

U.S. PATENT DOCUMENTS

| | | | | |
|---|---|---|---|---|
| 1,898,945 | A * | 2/1933 | Fitzgerald | A47J 43/08 366/205 |
| 5,671,759 | A * | 9/1997 | Chung | A45D 2/00 242/390.8 |
| 11,185,130 | B2 * | 11/2021 | Bock | A43C 11/165 |
| 2019/0246745 | A1 * | 8/2019 | Bock | A43C 11/20 |
| 2019/0246747 | A1 * | 8/2019 | Bock | A43C 11/165 |
| 2019/0387840 | A1 * | 12/2019 | Walker | A43C 1/00 |
| 2020/0281319 | A1 * | 9/2020 | Schneider | A43B 11/00 |
| 2020/0281320 | A1 * | 9/2020 | Schneider | H02P 3/025 |

* cited by examiner

*Primary Examiner* — David M Upchurch
(74) *Attorney, Agent, or Firm* — The Van Winkle Law Firm; William G. Heed; Sam Ferrell Alman, Jr.

(57) ABSTRACT

A worm drive fit system is provided, including a yoke member and a drive assembly, the drive assembly including a dial housing having an exterior and interior surface, wherein the interior surface includes a dial gear in operable engagement with a pinion gear. The drive assembly further includes a worm gear in operable engagement with the pinion gear, a spool gear in operable engagement with the worm gear, and a spool attached to the spool gear, wherein the spool is rotatably mounted to the yoke and configured to receive a filament to be tightened around the spool.

21 Claims, 17 Drawing Sheets

WORM DRIVE FIT SYSTEM

RELATED APPLICATION

This application claims priority to and incorporates entirely by reference U.S. Provisional Patent Application Ser. No. 63/170,118, filed Apr. 2, 2021.

FIELD OF THE INVENTION

This invention relates to fit systems for helmets, shoes, gloves, knee braces, and any item meant to be secured to the body or requiring adjustable tightening, and more particularly, to a worm gear driven mechanism for adjustably fitting an article according to a user's preferences.

BACKGROUND OF THE INVENTION

Helmets, shoes, gloves, knee braces, and other items meant to be secured to a body are often attached via a fixed or adjustable tightening mechanism. Such fixed tightening mechanisms have a limited scope of use given that a user may not adjust the fit of an article according to varying conditions and/or needs. Similarly, adjustable tightening mechanisms require complex multicomponent mechanisms to facilitate even tightening/loosening of an item and to ensure tension is maintained after tightening/loosening is completed.

Therefore, there exists a need for an adjustable fit system that provides for an even, consistent tightening and loosening mechanism that ensures a set tension is maintained after tightening and/or loosening is completed.

SUMMARY OF THE INVENTION

In accordance with one form of the invention, a worm drive fit system is provided. The worm drive fit system includes a yoke member and a drive assembly attached to or integrally formed with the yoke member. The drive assembly includes a dial housing having an exterior surface and an interior surface, wherein the interior surface includes a dial gear in operable engagement with a pinion gear so that the dial gear drives the pinion gear and the dial gear is reversibly rotatable. The drive assembly also includes a worm gear having a first terminal end and a second terminal end, the first terminal end in operable engagement with the pinion gear so that the pinion gear drives the worm gear. The drive assembly also includes a spool gear in operable engagement with the worm gear to drive the spool gear, and the spool gear attached to a spool, the spool being rotatably mounted to the yoke and configured to receive a filament to be tightened around the spool.

In accordance with another form of the invention, a worm drive fit system is provided. The worm drive fit system includes a yoke member including a yoke base, a spool mount member attached to or integrally formed with the yoke base, a worm gear mount member attached to or integrally formed with the yoke base, and a dial gear receiver attached to or integrally formed with the yoke base. The worm drive fit system also includes a drive assembly including a drive housing attached to the dial gear receiver, the drive housing having an exterior surface and an interior surface, wherein the interior surface includes a dial gear in operable engagement with a pinion gear so that the dial gear drives the pinion gear, the dial gear being reversibly rotatable. The drive assembly further includes a worm gear having a first terminal end and a second terminal end, the first terminal end in operable engagement with the pinion gear so that the pinion gear drives the worm gear. The drive assembly also includes a spool gear in operable engagement with the worm gear so that the worm gear drives the spool gear and the spool gear is attached to a spool, the spool being rotatably mounted to the spool mount member and configured to receive a filament to be tightened around the spool.

In accordance with another form of the invention, a worm drive fit system is provided. The worm drive fit system includes a yoke member including a yoke base, a spool mount member attached to or integrally formed with the yoke base, a worm gear mount member attached to or integrally formed with the yoke base, and a dial gear receiver attached to or integrally formed with the yoke base, and a drive assembly. The drive assembly includes a drive housing attached to the dial gear receiver, the drive housing having an exterior surface and an interior surface. The drive assembly also includes an exterior surface including a dial housing grip and a dial housing cap and an interior surface including a dial gear in operable engagement with a pinion gear so that the dial gear drives the pinion gear, the dial gear being reversibly rotatable. The drive assembly also includes a worm gear having a first terminal end and a second terminal end, the first terminal end in operable engagement with the pinion gear so that the pinion gear drives the worm gear, a spool gear in operable engagement with the worm gear so that the worm gear drives the spool gear, the spool gear attached to a spool, the spool being rotatably mounted to a spool mount. The drive assembly further includes the spool mount attached to or integrally formed with the yoke base and the spool containing one or more spool apertures, the one or more spool apertures configured to anchor a filament to be tightened around the spool.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 1:
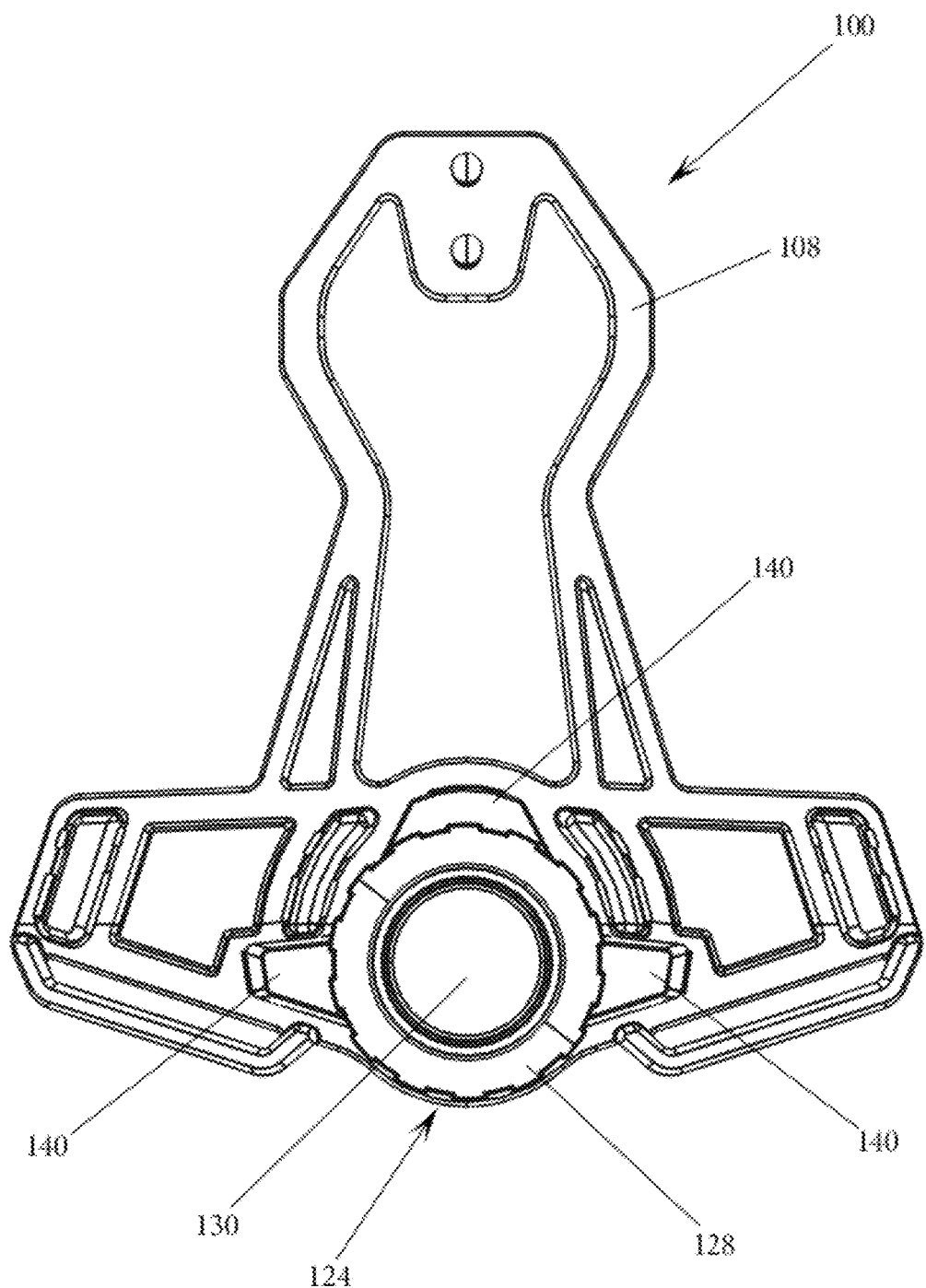
FIG. 1 is a front view of a worm drive fit system in accordance with one embodiment.
Figure 2:
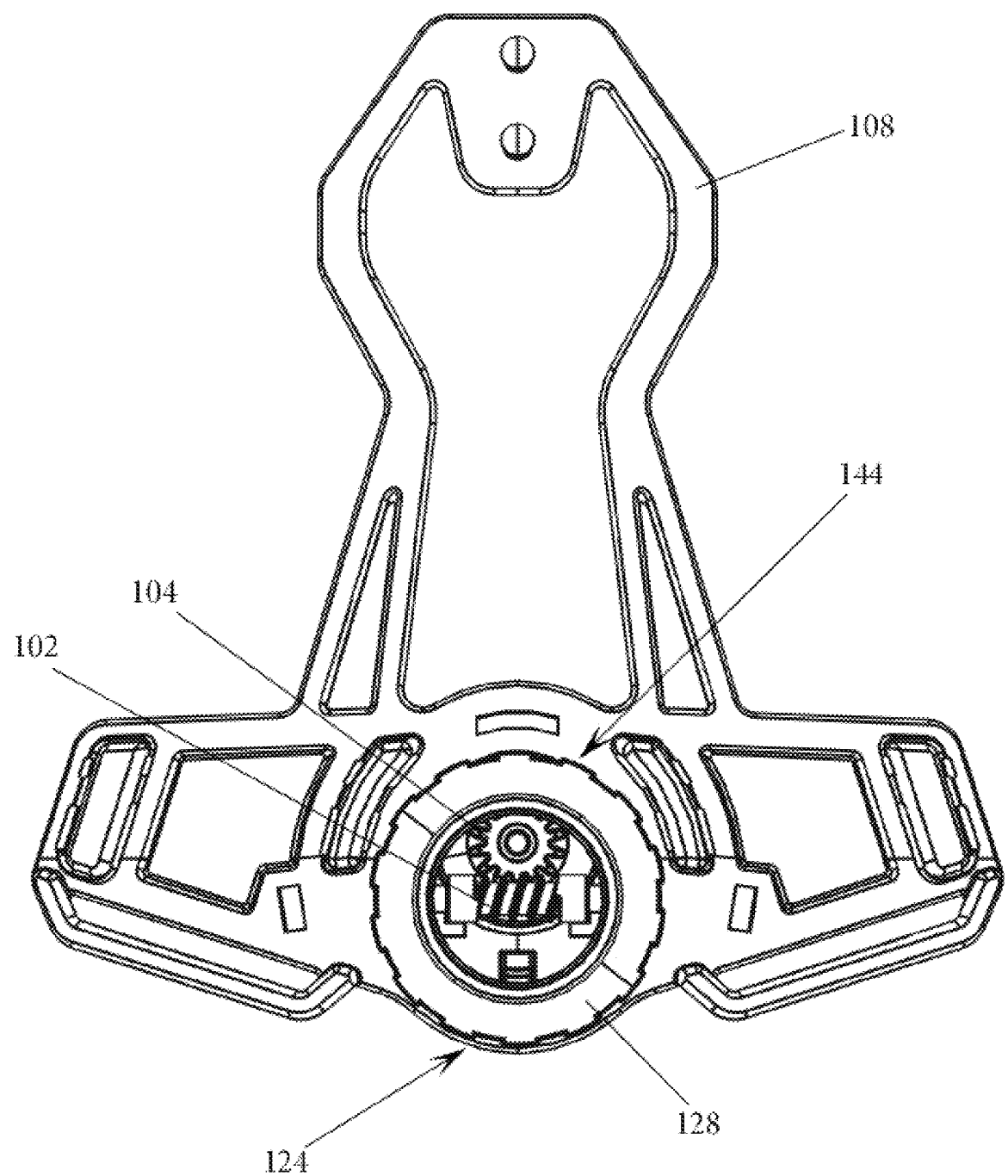
FIG. 2 is a front view of a worm drive fit system in accordance with one embodiment.
Figure 3:
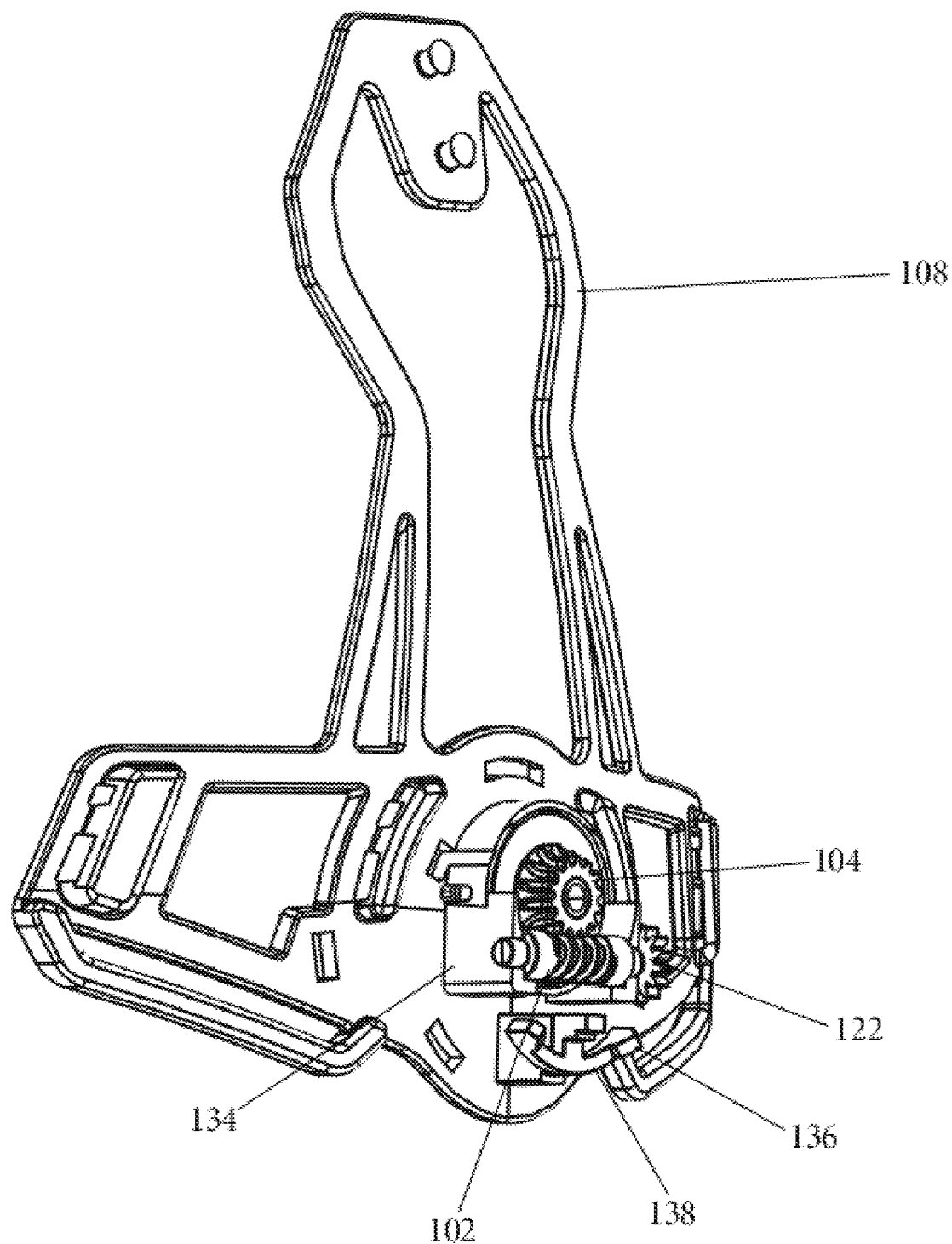
FIG. 3 is a side perspective view of a worm drive fit system in accordance with one embodiment.
Figure 4:
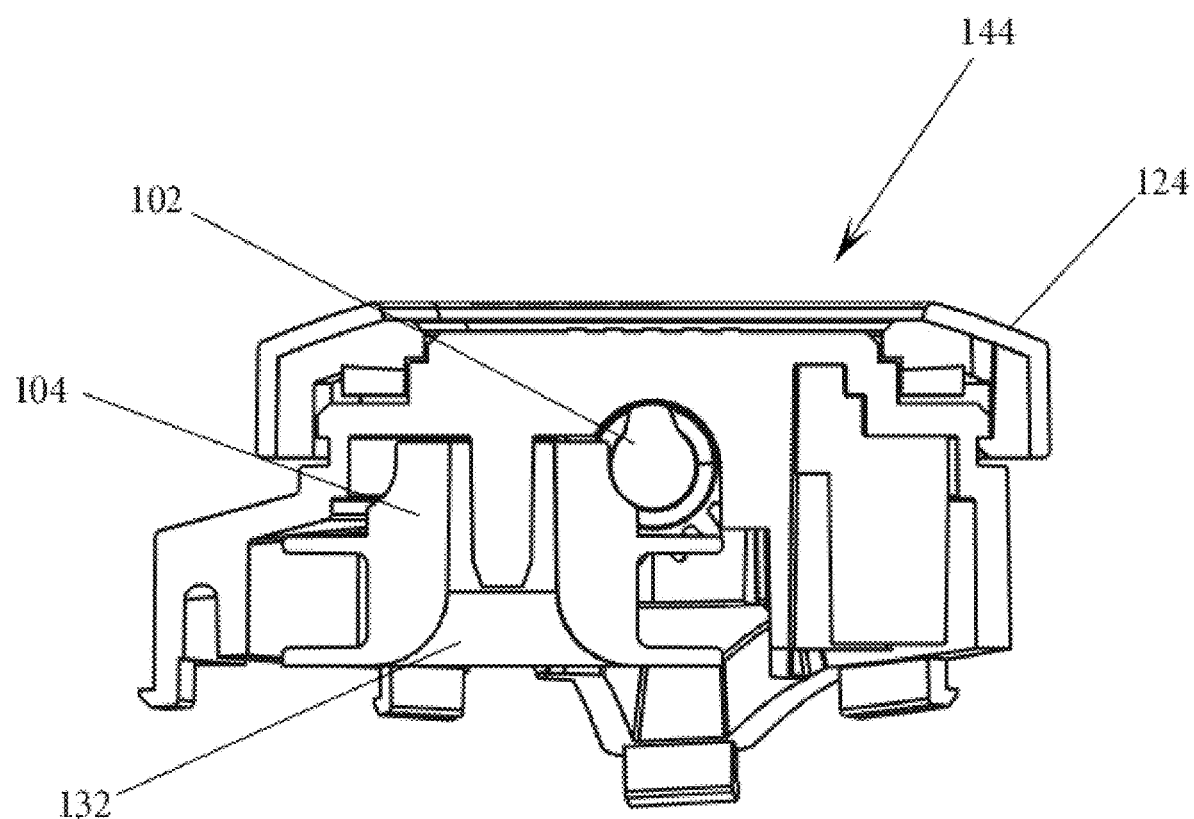
FIG. 4 is an isolated view of a worm drive fit system shown in cross-section in accordance with one embodiment.
Figure 5:
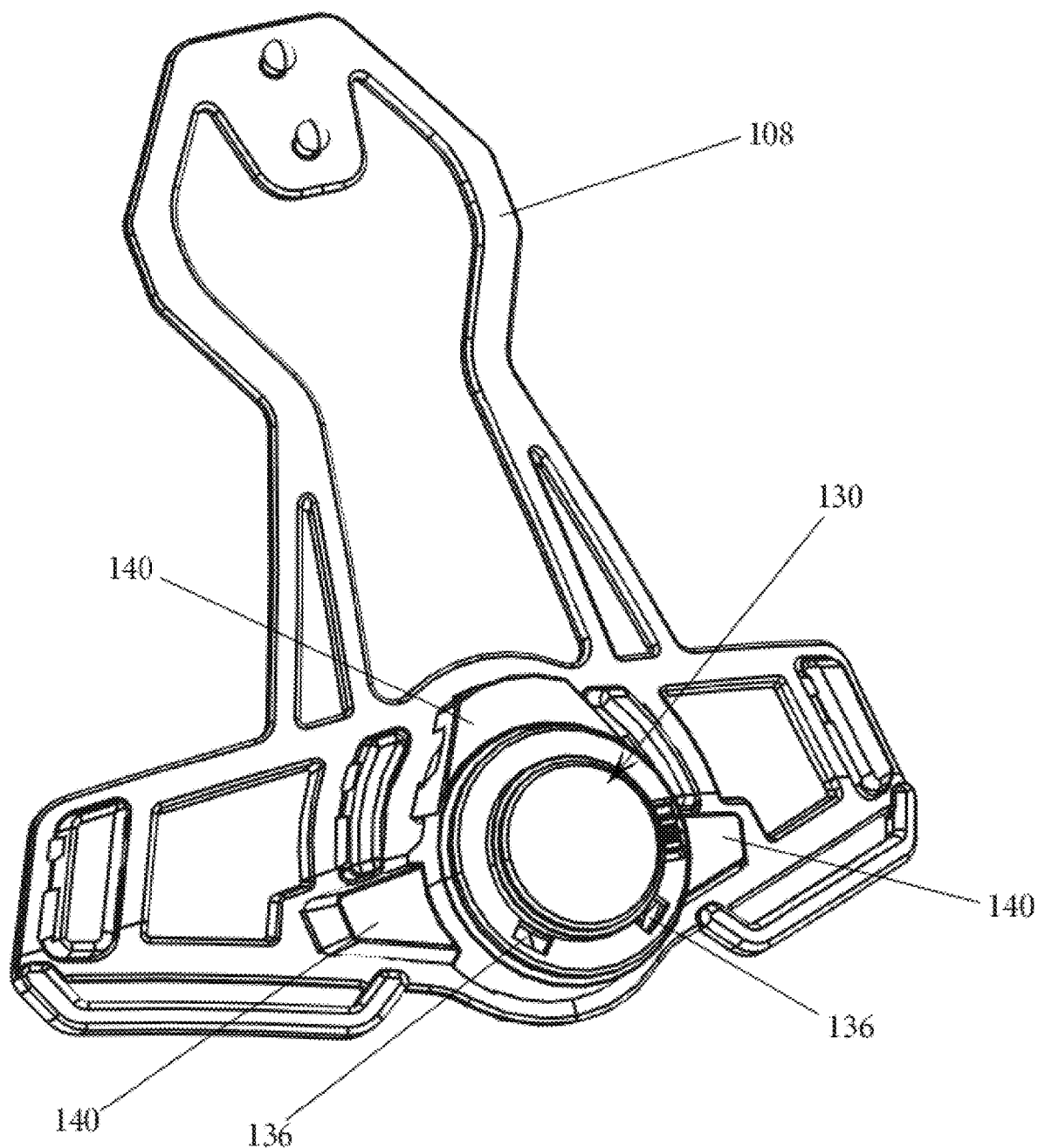
FIG. 5 is a is a perspective view of a worm drive fit system in accordance with one embodiment.
Figure 6:
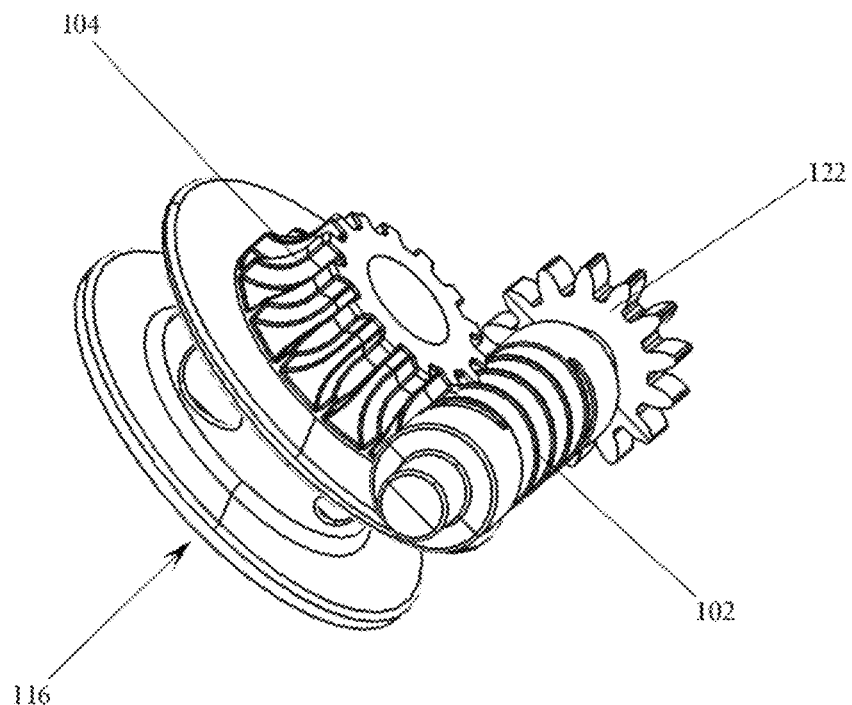
FIG. 6 is an isolated view of a spool, spool gear, worm gear, and pinion gear in accordance with one embodiment.

The worm drive fit system 100 is a device intended to be mounted into a helmet or into an accompanying fit solution to allow for fit and comfort adjustments. In most cases the worm drive fit system 100 may be adapted to head-worn products but the solution can also be used in shoes, gloves, knee braces, and any item meant to be secured to the body or requiring adjustable tightening. The fit system pulls a non-stretching filament 106 inward, coiling it around a spool 116. The tightening of this filament 106 pulls the fit system tight or pulls other parts of a fit system or garment tighter.

In one embodiment, the filament 106 is a single strand, circle, or larger diameter continuous ring of material starting on one side at the spool 116 and connecting at the other end at the same spool 116. The filament 106 may be made of Kevlar, polyester, polypropylene, nylon, natural fibers, or other similar synthetic materials. The filament 106 is coiled around the spool 116 when the spool 116 is rotated clockwise or counterclockwise. If rotating clockwise to tighten or shorten the filament 106, then rotating in a counterclockwise rotational direction will lengthen or loosen the filament 106. The opposite is also true—if tightening by rotating counterclockwise, then clockwise rotation will loosen the filament 106. The determination of tightening or loosening can only occur when filament 106 is fully extended to its maximum length, or largest diameter of the ring, thus allowing a user to choose the rotational direction to begin tightening of the filament 106 around the spool 116.

In one embodiment, the two ends of the filament 106 are fastened to opposing sides of the smallest diameter of the spool 116. In use, the filament 106 could weave through other components of the helmet, garment or fit solution and tighten or loosen the system or product.

The spool 116 is operationally rotated by a drive assembly 144 having multiple embodiments, described below. The drive system is the mechanism that causes the spool 116 to rotate clockwise or counterclockwise. The spool 116 is designed with one quarter of a gear face (also known as a pinion) engaged on the top side of the spool 116. This quarter gear profile is engaged to a helical thread also referred to as a worm gear 102.

When the worm gear 102 is rotated clockwise or counterclockwise, its helical thread or gear engages the spool gear 104 forcing rotation of the spool gear 104 around an axis. The spool gear 104 can only move clockwise or counterclockwise when the helical gear or worm gear 102 is rotated. The rotation of the worm gear 102 is approximately perpendicular to the rotation of the spool gear 104. The spool gear 104 is therefore fixed in the state in which it is last left when the driving mechanism (i.e., worm gear 102) is no longer rotated.

To better understand the interaction between the spool gear 104 and worm gear 102 during operation, context is needed around how they are assembled into the fit system 100. The same assembly may be used for each of the embodiments of the worm drive fit system 100 disclosed herein. The main difference between the embodiments of the fit system 100 disclosed herein is in how the worm gear 102 or helical gear is rotated.

The main retaining part of the worm drive fit system 100 is known as the yoke 108. The yoke 108 holds the components together and in position. The yoke 108 also connects the components to the helmet or other article of the worm drive fit system 100. It will be appreciated by one skilled in the art that the yoke 108 may take on different configurations depending on the product with which it is being used. For example, the yoke 108 for a helmet would be different in shape and size than a yoke 108 for a glove. The yoke 108 can also be referred to as the primary housing of the drive system. In one embodiment, the yoke 108 includes one or more filament guides 142 for facilitating the threading of the filament 106 throughout the helmet or other apparatus to which the worm drive fit system 100 is attached.

The yoke 108 holds the spool 116 and worm gear 102, and it serves as the lowest member, or in the case of a helmet fit system 100, the component that is closest to the head. A top piece or dial housing 124 is placed over the spool 116 and worm gear 102 to hold them in place. All components and all parts in both embodiments may be made from plastic or a similarly lightweight yet sturdy material, such as a carbon fiber, graphene, or lightweight metal or metal alloy.

The drive assembly 144 is attached to the yoke 108, including the spool gear 104, worm gear 102, and a dial housing 124. The worm drive fit system 100 also includes a click mechanism 110 for providing an audible sound to the user to indicate motion, rotation, and/or tightening/loosening. Without the audible click provided by the click mechanism 110, the worm drive fit system 100 is substantially silent.

Figure 7:
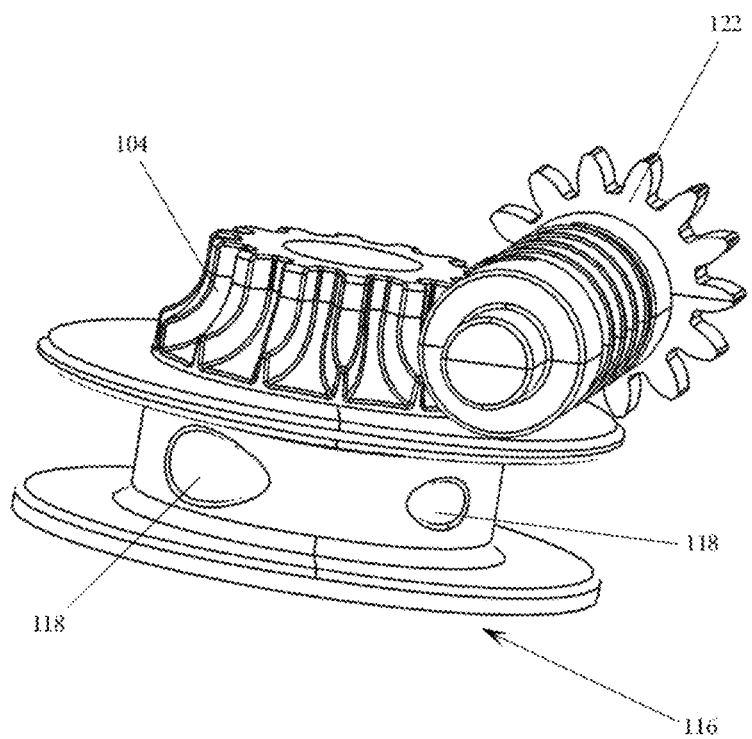
FIG. 7 is an isolated view of a spool, spool gear, worm gear, and pinion gear in accordance with one embodiment.
Figure 8:
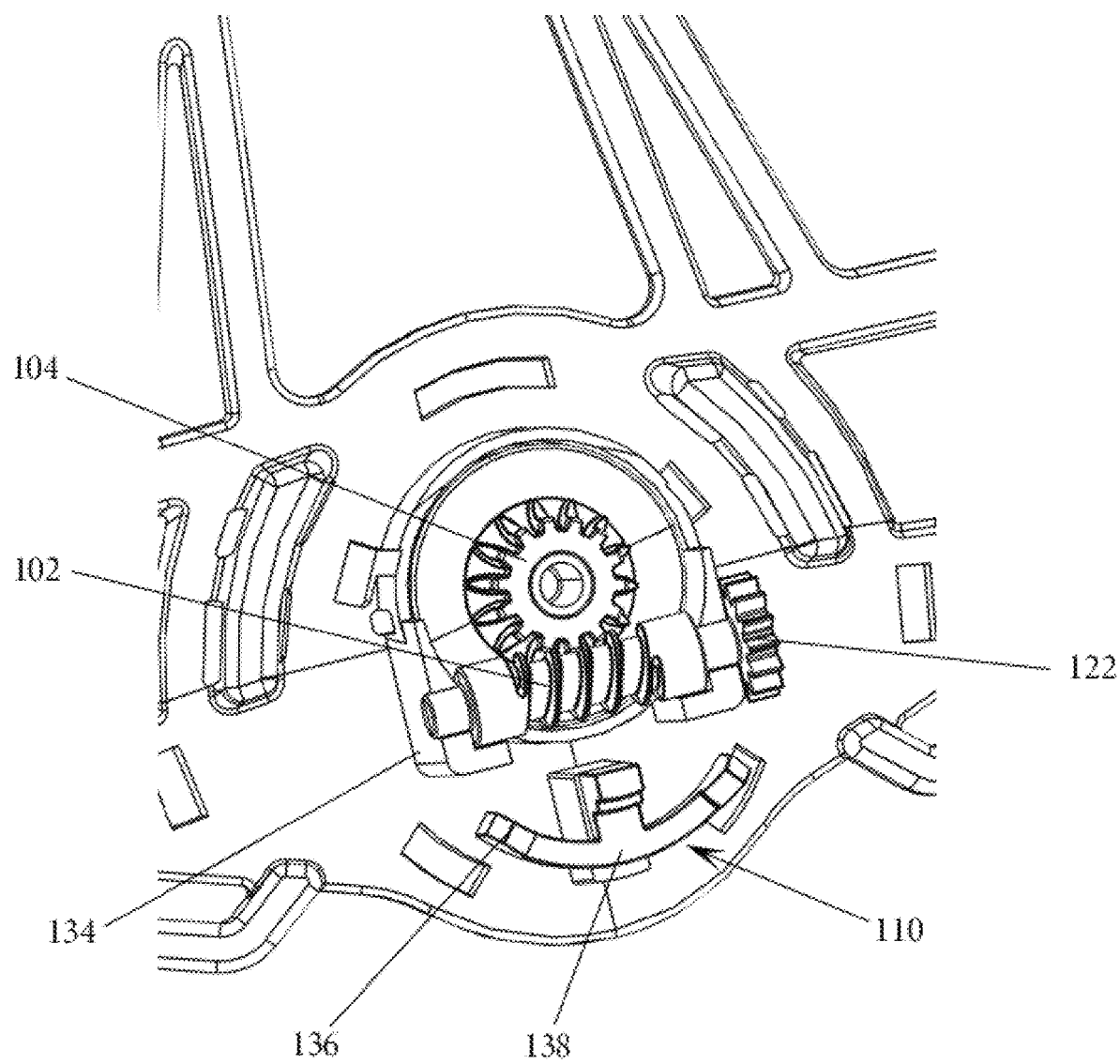
FIG. 8 is an isolated view of a worm drive fit system in accordance with one embodiment.
Figure 9:
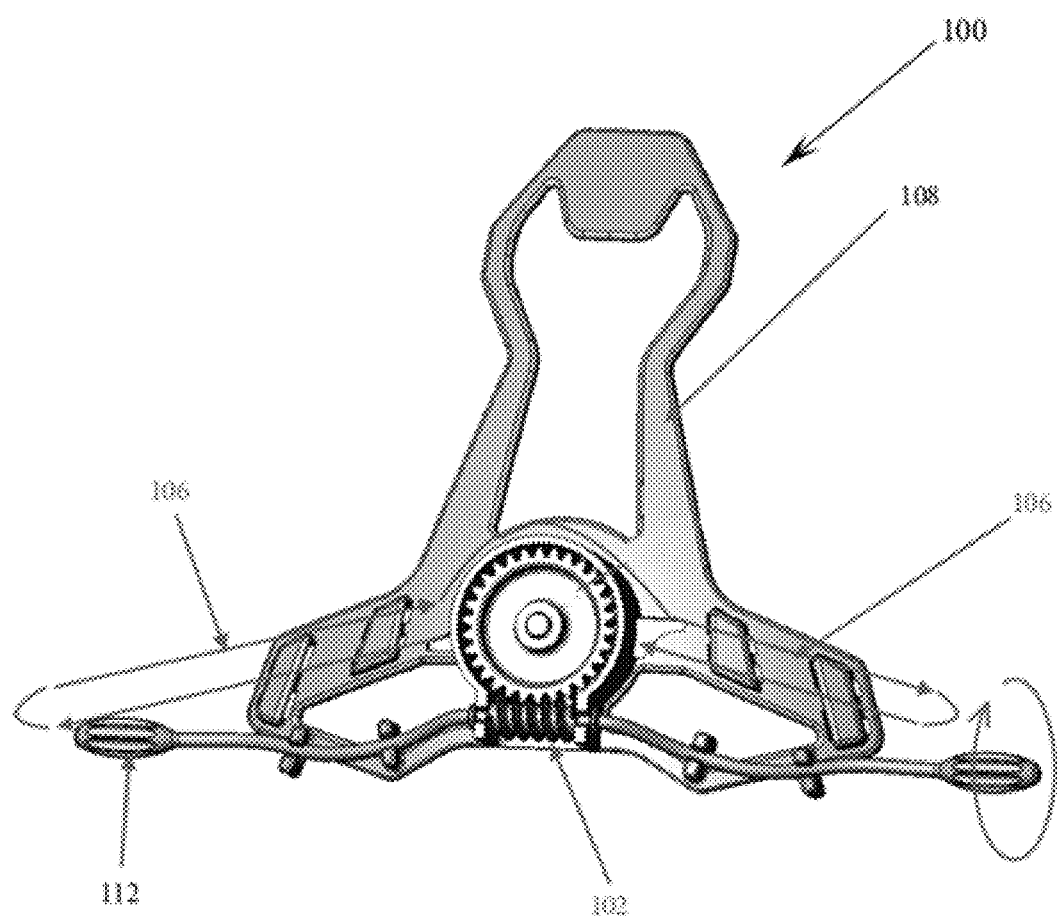
FIG. 9 is a front perspective view of a worm drive fit system in accordance with one embodiment.
Figure 10:
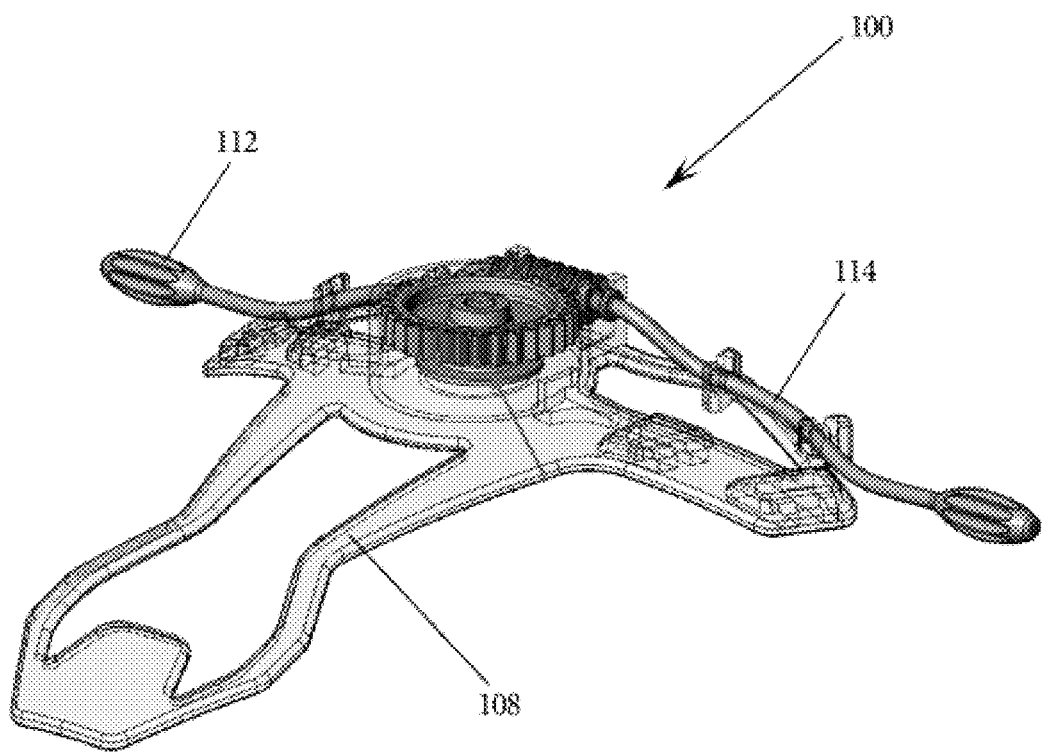
FIG. 10 is a top perspective view of a worm drive fit system in accordance with one embodiment.
Figure 11:
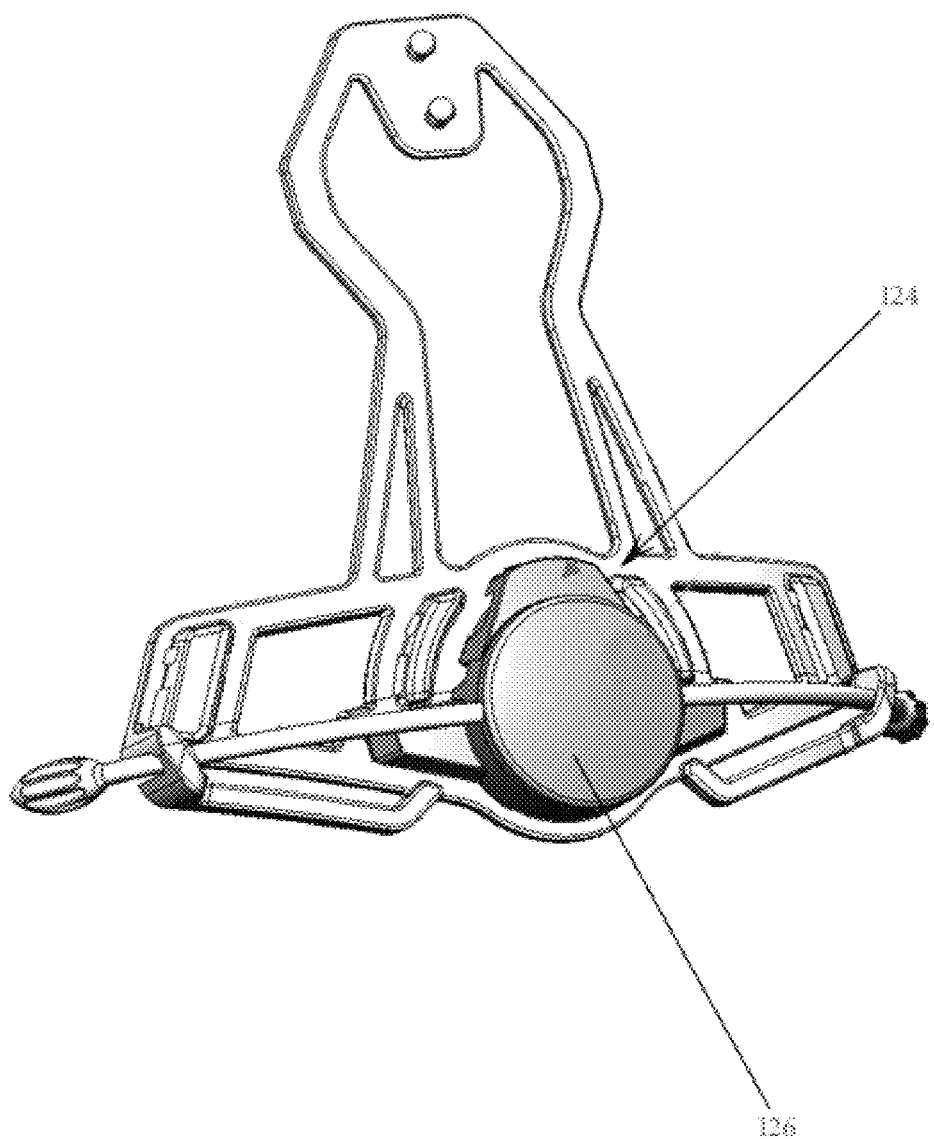
FIG. 11 is a front perspective view of a worm drive fit system in accordance with one embodiment.
Figure 12:
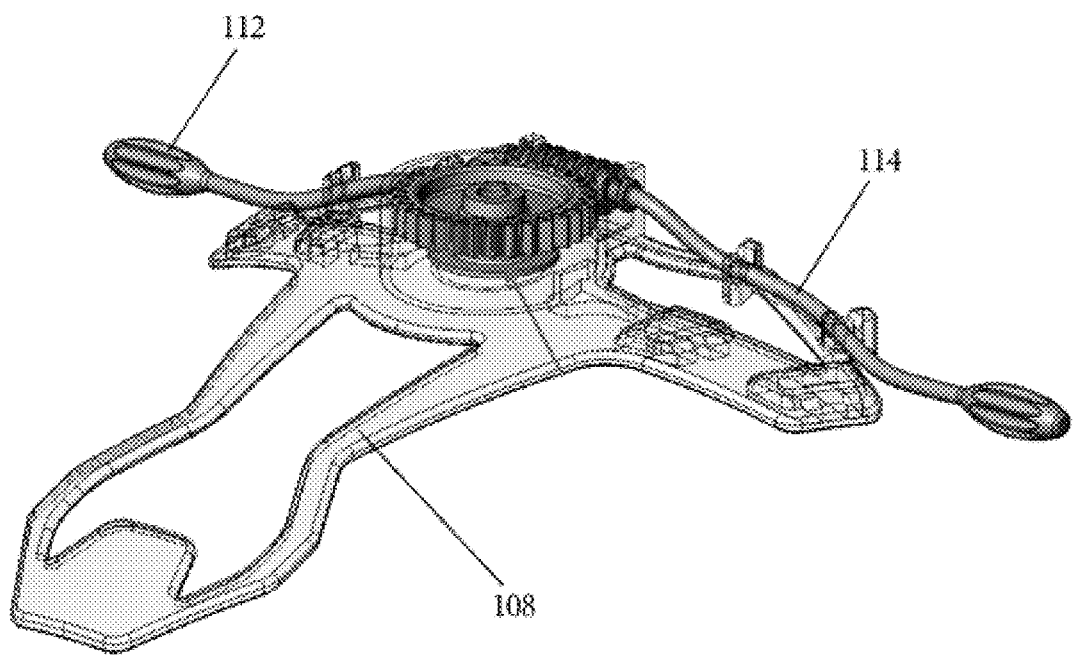
FIG. 12 is a front perspective view of a worm drive fit system in accordance with one embodiment.
Figure 13:
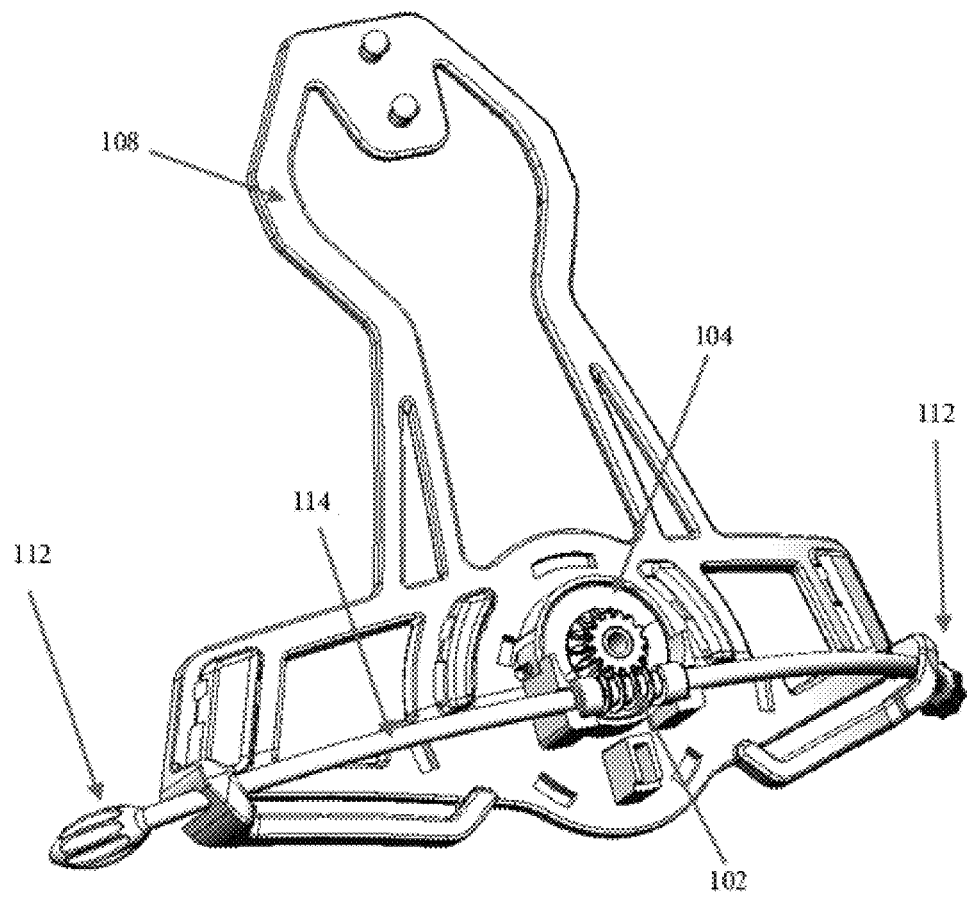
FIG. 13 is a front perspective view of a worm drive fit system in accordance with one embodiment.
Figure 14:
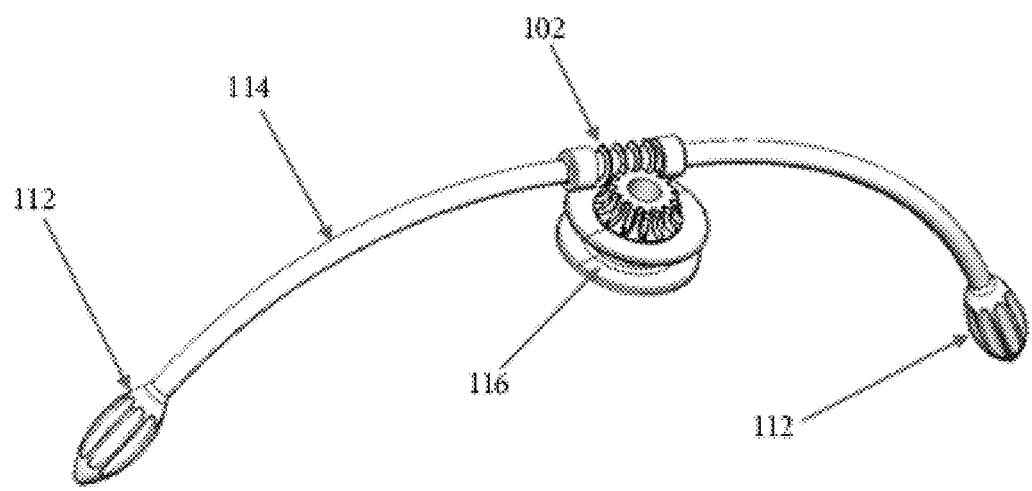
FIG. 14 is a perspective view of a twisting arm assembly and drive mechanism of a worm drive fit system in accordance with one embodiment.
Figure 15:
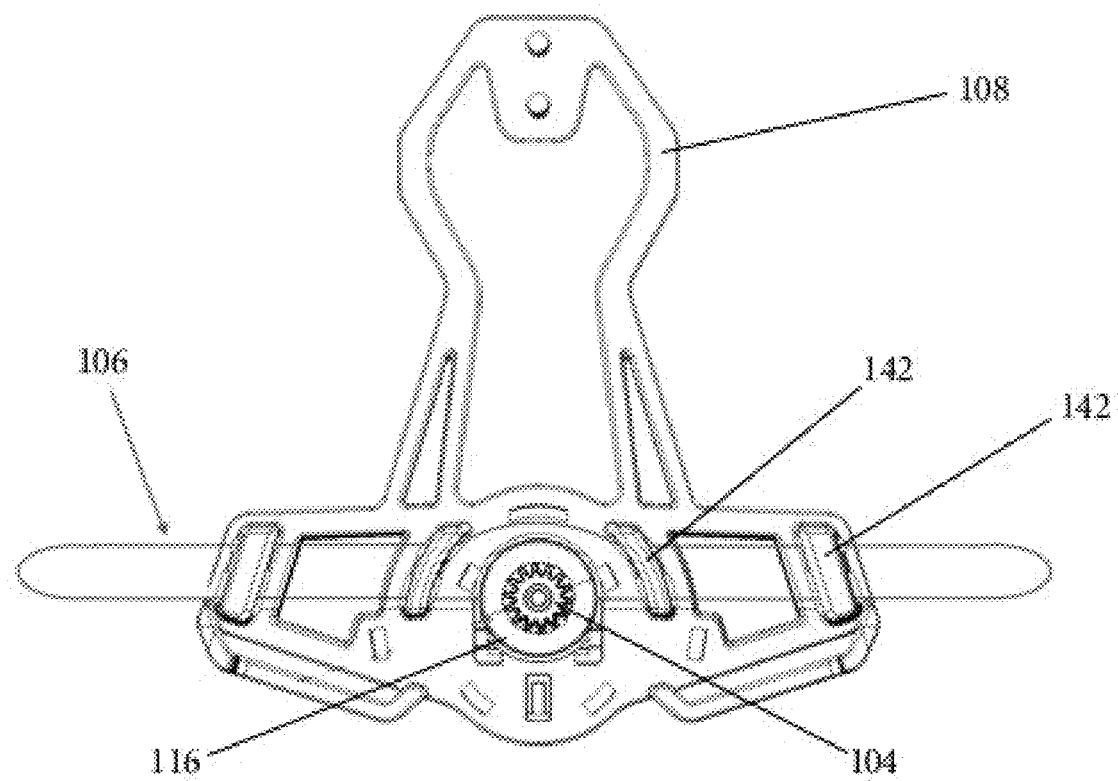
FIG. 15 is a front view of a worm drive fit system in accordance with one embodiment.
Figure 16:
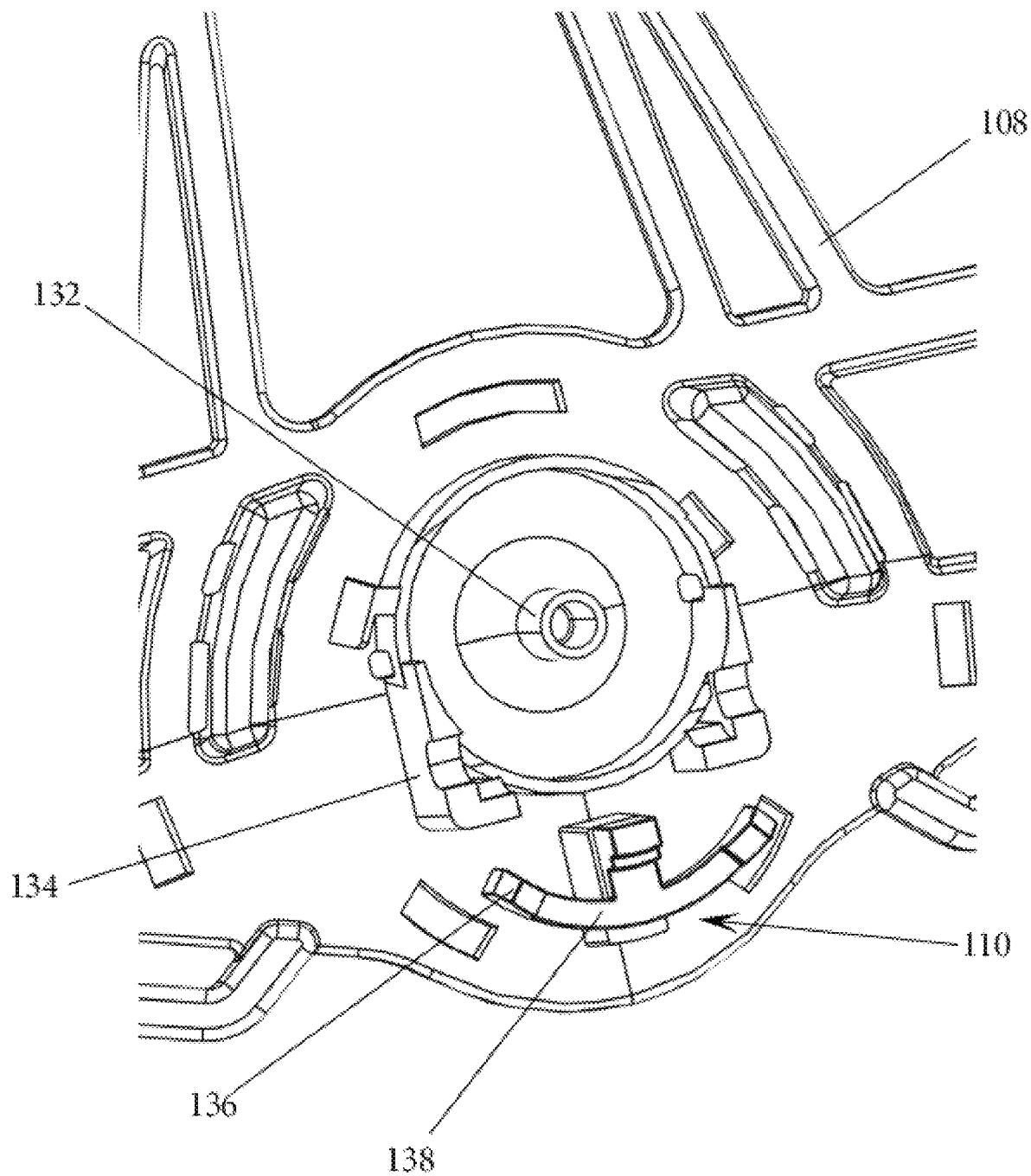
FIG. 16 is an isolated view of a worm drive fit system in accordance with one embodiment.
Figure 17:
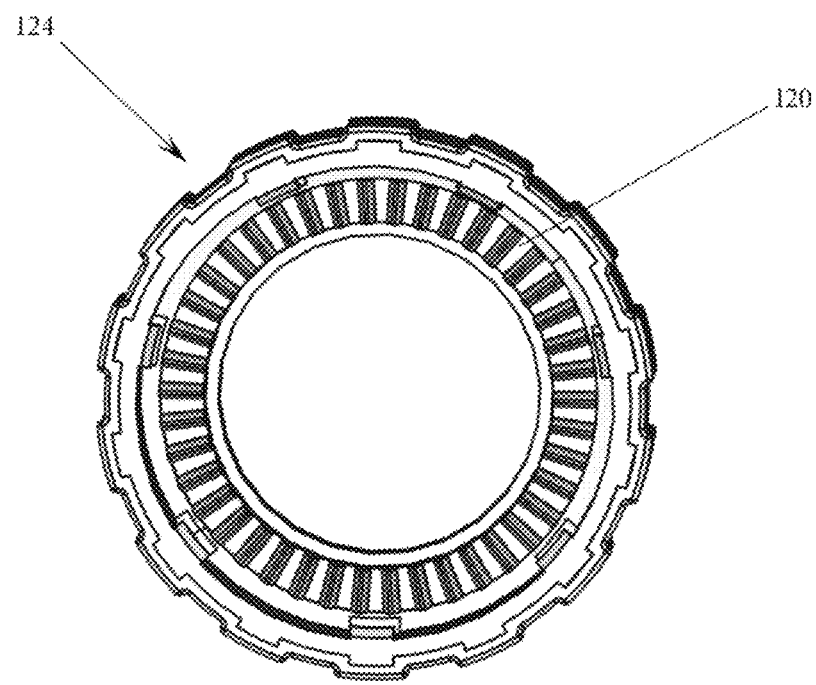
FIG. 17 is an isolated view of a dial housing cap in accordance with one embodiment.
Figure 18:
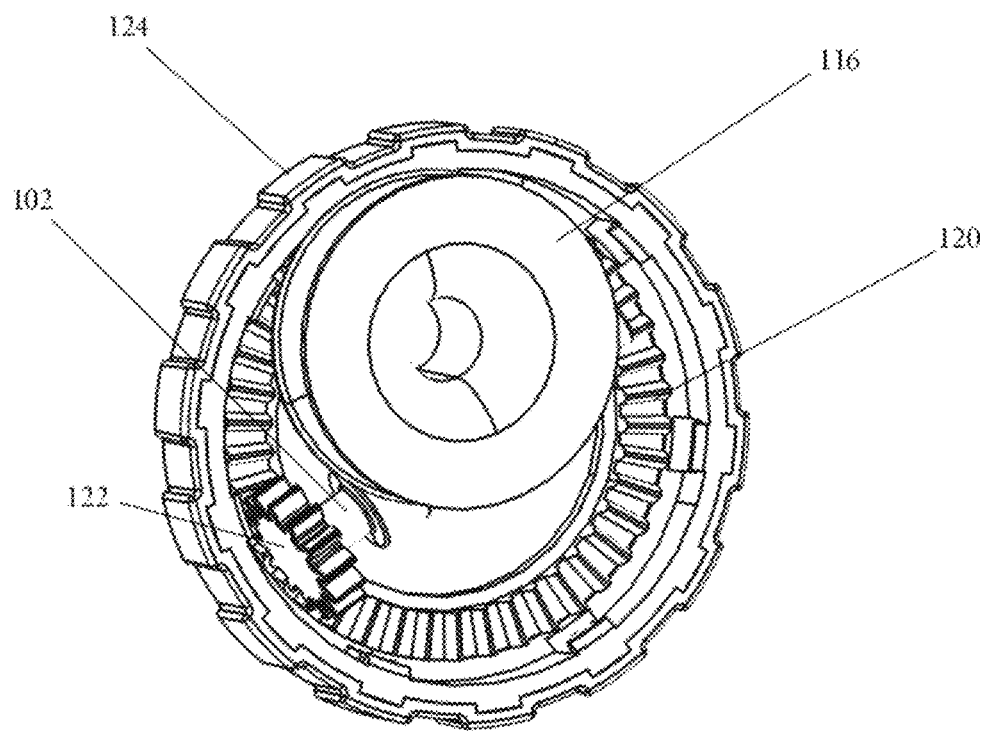
FIG. 18 is an isolated view of a dial housing cap assembly in accordance with one embodiment.
Figure 19:
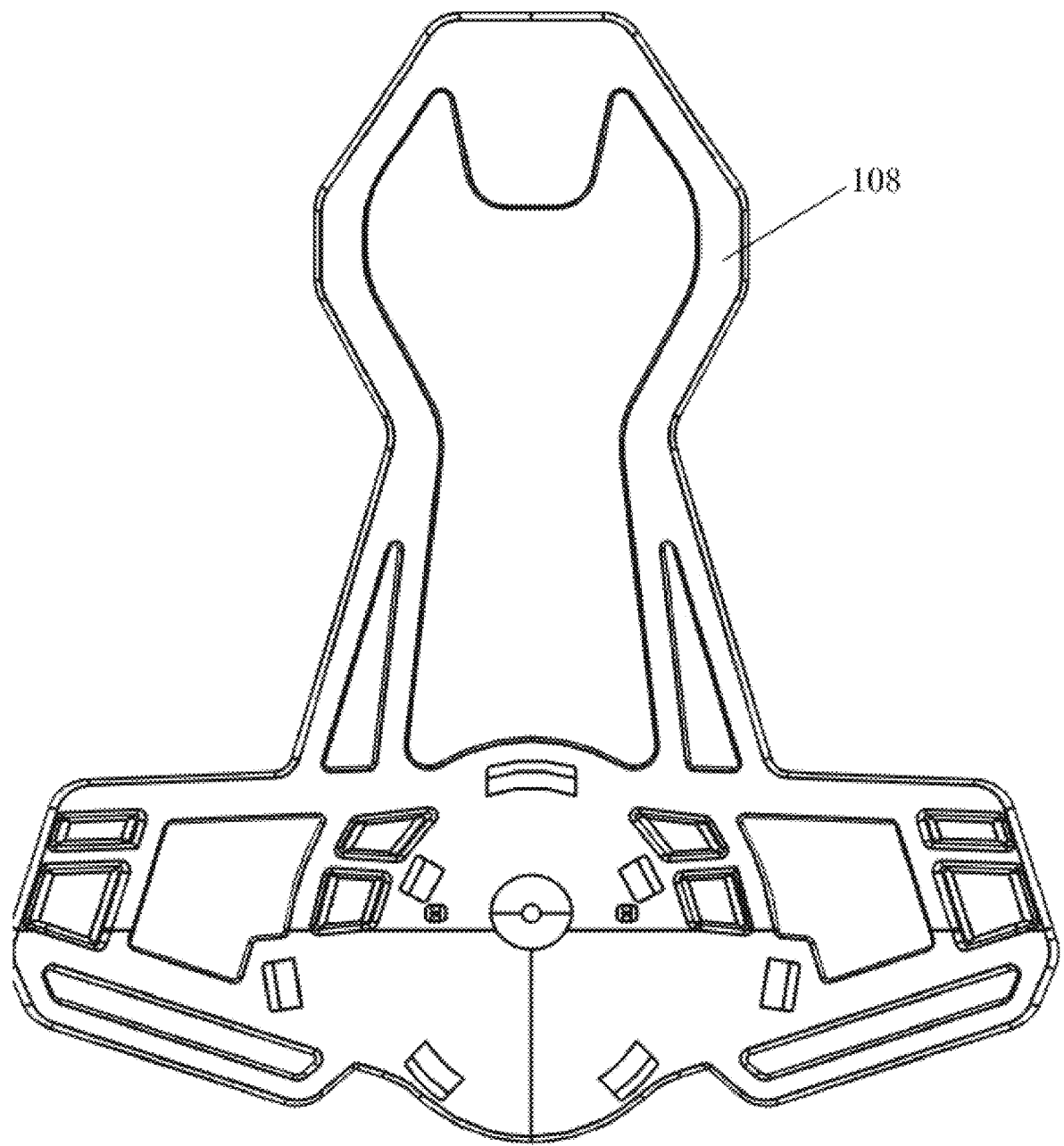
FIG. 19 is a rear view of a worm drive fit system in accordance with one embodiment.

Referring specifically to FIG. 7, in one embodiment, the filament 106 is anchored in the spool 116 via spool apertures 118 located in the center of the spool 116. The filament 106 may then travel out from the spool 116 through openings molded in the yoke 108 on one side. The filament 106 then travels to the other components in the product or system and makes a 180-degree return. The filament 106 passes over the yoke 108 through a molded in-channel and exits to the other side of the yoke 108, again out to other components on the opposing side in the product and then 180 degrees back into the yoke 108 where it is anchored into the spool 116 through the spool apertures 118 on the opposing side.

Referring specifically to FIGS. 1-9 and FIGS. 15-19, the system includes a yoke 108, a yoke mount 140, a spool 116, a spool gear 104, a worm gear 102, a click mechanism 110, a dial housing 124, a dial housing grip 128, a dial housing cap 130, a dial gear 120, and a pinion gear 122.

In one embodiment, the worm gear 102 is driven by a larger dial gear 120 that is the main interface for the user. The dial housing grip 128 can be rotated clockwise or counterclockwise as described above. The dial housing 124 itself has a dial gear 120 molded on the underside of the dial housing 124. The dial housing 124 includes a dial housing grip 128 that may be a multi-material design to be both rigid and provide a softer durometer grip over mold for comfort.

The dial gear 120 interfaces with a smaller circular pinion gear 122 that is molded onto the worm gear 102.

In one embodiment, the worm gear 102 or helical gear has a smaller circular pinion gear 122 in operable connection with one end of the worm gear 102. The smaller circular pinion gear 122 interfaces with the larger dial gear 120 in a 2.5:1 gearing ratio. Accordingly, each full rotation of the larger dial gear 120 by the user results in 2.5 rotations of the worm gear 102. This is again geared down from the worm gear 102 to the spool gear 104 in a 12:1 ratio. Accordingly, each full rotation of the spool gear 104 takes 12 rotations of the worm gear 102 and 4.8 rotations of the dial gear 120.

In one embodiment, a worm gear mount 134 is attached to or integrally formed with the yoke 108. The worm gear mount 134 provides support for the worm gear 102, wherein the worm gear 102 may be mounted upon the worm gear mount 134 by frictional attachment or otherwise similarly secured. In one embodiment, a spool mount 132 may be attached to or integrally formed with the yoke 108. The spool mount 132 provides support for the spool 116, wherein the spool may be mounted upon the spool mount 132 by frictional attachment or otherwise similarly secured. In one embodiment, a yoke mount 140 may be attached to or integrally formed with the yoke 108. The yoke mount 140 provides a support and/or attachment base for the spool mount 132, worm gear mount 134, spool 116, and other components coupled to the yoke 108.

The click mechanism 110 is captured between the yoke 108 and the dial housing 124. The click mechanism 110 includes click mechanism tines 136 mounted on the click mechanism mount 138, which in turn, may be attached to or integrally formed with the yoke 108. The click mechanism tines 136 protrude through the dial housing 124 and ride on the dial gear 120. The click mechanism 110 is meant to interface with the dial gear 120 and provide sufficient resistance so that when this resistance is overcome, the click mechanism 110 provides an audible click as one or more click mechanism tines 136 passes over one or more teeth of the dial gear 120 and each click mechanism tine 136 impacts the next respective tooth of the dial gear 120. The dial gear 120 and dial housing grip 128 may be snapped onto the dial housing 124 or otherwise frictionally secured. The receiving portion of the dial housing 124 is molded with a relief to accept under cuts molded on to the dial gear 120.

The click mechanism 110 interacts with the dial gear 120 to provide audible feedback to the user. In one embodiment, the click mechanism 100 may interface with the dial gear 120, which provides audible feedback based on dial housing 124 rotation. In other embodiments, the click mechanism 100 may interface with the spool gear 104 or worm gear 102, thus providing audible feedback on spool rotation.

In one embodiment, the worm drive fit system 100 facilitates tightening and loosening of a filament 106 through the motion of a worm gear 102 and/or pinion gear 122. The worm gear 102 is used to prevent slippage or loosening of the filament 106 by virtue of the design and function of the worm gear 102. In other words, the worm gear 102 prevents the coupled gear or gears from moving or rotating when the worm gear 102 is not being engaged and rotated.

A worm gear 102 may have both worm or helical gears and may be engaged with a smaller circular pinion gear 122. In certain embodiments, select components may be molded as one or more single parts. As a nonlimiting example, the spool gear 104 may be a combination of both a spool 116 and a gear, where the gear is molded into the top side of the spool 116. The spool gear 104 or pinion gear 122 may be molded in a degree or one-quarter of the full rotation. This arrangement provides maximum coverage to the worm gear 102 and also cradles the worm gear 102. The spool 116 may be configured to coil the filament 106 in both clockwise and counterclockwise rotational directions based upon user preference.

The dial gear 120 may be molded in a gear system that interacts with the small circular pinion gear 120 on the worm gear 102 and therefore the spool gear 104. This 4.8:1 ratio designed into the system allows for fine tuning and micro adjustments. Accordingly, small amounts of dial housing 124 rotation result in very precise tightening and loosening of the filament 106 around the spool 116.

Referring now to FIGS. 9-14, an embodiment of the worm drive fit system 100 is shown including a yoke 108, spool gear 104, worm gear 102, twist arms 114, twist handles 112, dial housing 124, and top cap 126.

In this embodiment there is no dial housing grip 128 and the dial housing 124 is not used to tighten or loosen the filament 106. As in other embodiments of the worm drive fit system 100, this embodiment employs a spool gear 104. One or more twist arms 114 extend from the worm gear 102. The twist arms 114 may be molded as part of the same component as the worm gear 102. These twist arms 114 may have some degree of flex and can deflect and/or be tethered down, either in the yoke 108, as shown, or in other components of the helmet system or soft good, such as an ear pad or helmet liner pad. At the ends of the arms 114 are twist handles 112 for allowing a user to apply a twisting motion.

The twist arms 114 may be selectively twisted clockwise or counterclockwise to rotate the worm gear 102 in the corresponding direction. This results in rotation of the spool gear 104, which in turn, rotates the spool 116 to either tighten or loosen the filament 106. A benefit to this approach is that the user no longer needs to reach behind his or her head to tighten or loosen the system. Rather, a user may reach up to the side of his or her head to grasp the twist arm 114. This approach also allows for the filament 106 to wind around the spool 116 in a clockwise or counterclockwise direction to either tighten or loosen the filament 106 around the spool 116. This direction of rotation and tightening may be established when the filament 106 is fully extended and unspooled.

In one embodiment the click mechanism 110 may be molded into the dial housing 124, wherein the click mechanism 110 interacts with the teeth of spool gear 104. As the spool gear 104 rotates, the click mechanism tine 136 is bent and snapped to the next gear tooth, creating an audible clicking sound.

In one embodiment, the worm drive fit system 100 may tighten and loosen a filament 106 through the motion of a worm gear 102 and/or pinion gear 122. The worm gear 102 is used to prevent slippage or loosening of the filament 106 by virtue of the design. In other words, when the helical grooves of the worm gear 102 are engaged with the spool gear 104, small circular gear 120, dial gear 120, and/or other gear, the worm gear 102 grooves prevent the coupled gear from rotating unless the worm gear 102 is engaged and rotated.

In one embodiment, the worm gear 102 may have a worm and/or helical gearing coupled to twist arms 114 and/or twist handles 112 and these components may be molded as a single part.

The spool gear 104 may be composed of both a spool 116 and a spool gear 104 with the spool gear 104 molded into or integrally formed with the top side of the spool 116. The worm gear 102 or pinion gear 122 may be molded at 90 degrees or one-quarter of the full rotation. This arrangement provides maximum coverage to the worm gear 102 and also cradles the worm gear 102.

In one embodiment, the spool 116 can coil the filament in both clockwise and counterclockwise rotations based on the user preference.

In one embodiment, the twist arms 114 contain a flexible drive shaft connecting the twist handle 112 to the worm gear 102 to allow a user to rotate the twist handle 112 to cause rotation of the worm gear 102, thus tightening or loosening the filament 106 of the worm drive fit system 100.

In one embodiment the twist arms 114 can be located and/or housed on another part of the product or article of the system to which it is attached, such as a fabric liner, nylon strap webbing, or rigid component.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that are written, or may be written, for the subject invention.

What is claimed is:

1. A worm drive fit system comprising:
a yoke member; and
a drive assembly attached to or integrally formed with the yoke member, the drive assembly comprising:
a dial housing having an exterior surface and an interior surface, wherein the interior surface includes a dial gear in operable engagement with a pinion gear so that the dial gear drives the pinion gear, the dial gear being reversibly rotatable;
a worm gear having a first terminal end and a second terminal end, the first terminal end in operable engagement with the pinion gear so that the pinion gear drives the worm gear;
a spool gear in operable engagement with the worm gear so that the worm gear drives the spool gear; and
the spool gear attached to a spool, the spool being rotatably mounted to the yoke and configured to receive a filament to be tightened around the spool.

2. The worm drive fit system of claim 1, wherein the dial gear includes a plurality of dial gear teeth; and
the drive assembly further comprising an audible click mechanism, the click mechanism including at least one flexible tine sized for engaged receipt with at least one dial gear tooth, wherein the rotation of the dial gear causes the tine to slide over the plurality of dial gear teeth.

3. The worm drive fit system of claim 1, wherein the spool gear is integrated with the spool.

4. The worm drive fit system of claim 1, wherein the dial gear is engaged perpendicular to the pinion gear.

5. The worm drive fit system of claim 1, wherein the pinion gear engages the worm gear in a 2.5:1 gearing ratio and the worm gear engages the spool gear in a 12:1 gearing ratio.

6. The worm drive fit system of claim 1, further comprising:
one or more filament guides attached to or integrally formed with the yoke base, the one or more filament guides being configured to control the path of the filament.

7. The worm drive fit system of claim 1, wherein the filament has a first end and a second end, wherein the first end and the second end are attached to the spool.

8. A worm drive fit system comprising:
a yoke member, the yoke member comprising:
a yoke base;
a spool mount member attached to or integrally formed with the yoke base;
a worm gear mount member attached to or integrally formed with the yoke base; and
a dial gear receiver attached to or integrally formed with the yoke base; and
a drive assembly, the drive assembly comprising:
a drive housing attached to the dial gear receiver, the drive housing having an exterior surface and an interior surface, wherein the interior surface includes a dial gear in operable engagement with a pinion gear so that the dial gear drives the pinion gear, the dial gear being reversibly rotatable;
a worm gear having a first terminal end and a second terminal end, the first terminal end in operable engagement with the pinion gear so that the pinion gear drives the worm gear;
a spool gear in operable engagement with the worm gear so that the worm gear drives the spool gear; and
the spool gear attached to a spool, the spool being rotatably mounted to the spool mount member and configured to receive a filament to be tightened around the spool.

9. The worm drive fit system of claim 8, wherein the dial gear includes a plurality of dial gear teeth;
the drive assembly further comprising an audible click mechanism, the click mechanism including at least one flexible tine sized for engaged receipt with at least one dial gear tooth, wherein the rotation of the dial gear causes the tine to slide over the plurality of dial gear teeth.

10. The worm drive fit system of claim 8, wherein the spool gear is integrated with the spool.

11. The worm drive fit system of claim 8, wherein the dial gear is engaged perpendicular to the pinion gear.

12. The worm drive fit system of claim 8, wherein the pinion gear engages the worm gear in a 2.5:1 gearing ratio and the worm gear engages the spool gear in a 12:1 gearing ratio.

13. The worm drive fit system of claim 8, further comprising:
one or more filament guides attached to or integrally formed with the yoke base, the one or more filament guides being configured to control the path of the filament.

14. The worm drive fit system of claim 8, wherein the filament has a first end and a second end, wherein the first end and the second end are attached to the spool.

15. A worm drive fit system comprising:
a yoke member, the yoke member comprising:
a yoke base;
a spool mount member attached to or integrally formed with the yoke base;
a worm gear mount member attached to or integrally formed with the yoke base; and
a dial gear receiver attached to or integrally formed with the yoke base; and
a drive assembly, the drive assembly comprising:
a drive housing attached to the dial gear receiver, the drive housing having an exterior surface and an interior surface;
the exterior surface including a dial housing grip and a dial housing cap;
the interior surface including a dial gear in operable engagement with a pinion gear so that the dial gear drives the pinion gear, the dial gear being reversibly rotatable;
a worm gear having a first terminal end and a second terminal end, the first terminal end in operable engagement with the pinion gear so that the pinion gear drives the worm gear;
a spool gear in operable engagement with the worm gear so that the worm gear drives the spool gear;
the spool gear attached to a spool, the spool being rotatably mounted to a spool mount;
the spool mount attached to or integrally formed with the yoke base; and
the spool containing one or more spool apertures, the one or more spool apertures configured to anchor a filament to be tightened around the spool.

16. The worm drive fit system of claim 15, wherein the dial gear includes a plurality of dial gear teeth;
the drive assembly further comprising an audible click mechanism, the click mechanism including at least one flexible tine sized for engaged receipt with at least one dial gear tooth, wherein the rotation of the dial gear causes the tine to slide over the plurality of dial gear teeth.

17. The worm drive fit system of claim 15, wherein the spool gear is integrated with the spool.

18. The worm drive fit system of claim 15, wherein the dial gear is engaged perpendicular to the pinion gear.

19. The worm drive fit system of claim 15, wherein the pinion gear engages the worm gear in a 2.5:1 gearing ratio and the worm gear engages the spool gear in a 12:1 gearing ratio.

20. The worm drive fit system of claim 15, further comprising:
    one or more filament guides attached to or integrally formed with the yoke base, the one or more filament guides being configured to control the path of the filament.

21. The worm drive fit system of claim 15, wherein the filament has a first end and a second end, wherein the first end and the second end are attached to the spool.

\* \* \* \* \*